(12) United States Patent
Zhao et al.

(10) Patent No.: US 8,392,380 B2
(45) Date of Patent: Mar. 5, 2013

(54) LOAD-BALANCING AND SCALING FOR ANALYTICS DATA

(75) Inventors: Mingyang Zhao, Issaquah, WA (US); Prashant Kamani, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 12/512,776

(22) Filed: Jul. 30, 2009

(65) Prior Publication Data

US 2011/0029581 A1  Feb. 3, 2011

(51) Int. Cl.
*G06F 17/00* (2006.01)
(52) U.S. Cl. ...................................... 707/688
(58) Field of Classification Search ............... 707/688, 707/999.102
See application file for complete search history.

(56) References Cited

U.S. PATENT DOCUMENTS

| | | | |
|---|---|---|---|
| 5,333,315 A | 7/1994 | Saether et al. | |
| 5,734,887 A | 3/1998 | Kingberg et al. | |
| 6,202,062 B1 | 3/2001 | Cameron et al. | |
| 6,301,579 B1 | 10/2001 | Becker | |
| 6,374,263 B1 | 4/2002 | Bunger et al. | |
| 6,493,699 B2 | 12/2002 | Colby et al. | |
| 6,546,389 B1 | 4/2003 | Agrawal et al. | |
| 6,553,412 B1 | 4/2003 | Kloba et al. | |
| 6,772,150 B1 | 8/2004 | Whitman et al. | |
| 6,785,768 B2 | 8/2004 | Peters et al. | |
| 6,950,848 B1 | 9/2005 | Yousefi'zadeh | |
| 7,051,038 B1 | 5/2006 | Yeh et al. | |
| 7,051,245 B2 | 5/2006 | Brown et al. | |
| 7,085,682 B1 * | 8/2006 | Heller et al. | 702/186 |
| 7,203,909 B1 | 4/2007 | Horvitz et al. | |
| 7,313,576 B2 | 12/2007 | Clark et al. | |
| 7,337,370 B2 | 2/2008 | Haynes et al. | |
| 7,340,472 B2 | 3/2008 | Makus et al. | |
| 7,389,305 B1 * | 6/2008 | Kindig et al. | 1/1 |
| 7,403,945 B2 | 7/2008 | Lin et al. | |
| 7,493,352 B2 | 2/2009 | O'Neil et al. | |
| 7,499,939 B2 | 3/2009 | Jandhyala et al. | |
| 7,673,340 B1 * | 3/2010 | Cohen et al. | 726/22 |
| 7,865,499 B2 | 1/2011 | Schumacher | |
| 7,895,191 B2 | 2/2011 | Colossi et al. | |
| 7,941,525 B1 * | 5/2011 | Yavilevich | 709/224 |
| 7,962,580 B2 | 6/2011 | Gagliardi et al. | |
| 8,082,247 B2 | 12/2011 | Kumthekar et al. | |
| 8,135,753 B2 | 3/2012 | Zhao | |
| 2001/0056367 A1 | 12/2001 | Herbert et al. | |
| 2002/0063735 A1 | 5/2002 | Tamir et al. | |
| 2002/0065912 A1 * | 5/2002 | Catchpole et al. | 709/224 |
| 2002/0099818 A1 | 7/2002 | Russell et al. | |

(Continued)

OTHER PUBLICATIONS

"9 Oracle Net," https://students.kiv.zcu.cz/doc/oracle/ gateways.102/ b16218/net.htm, pp. 1-6 (Publicly known at least as early as Apr. 22, 2009).

(Continued)

*Primary Examiner* — Kimberly Wilson
*Assistant Examiner* — Mohammed R Uddin
(74) *Attorney, Agent, or Firm* — Merchant & Gould P.C.

(57) ABSTRACT

Load-balancing and scaling for analytics data may be provided. A logging system may receive data and select a stager database in which to store the data. The selection may be made according to an identifier associated with the data. The stored data may be processed and stored back to the stager database before being copied to a reporting database. The processed data may be aggregated with other data in the reporting database to provide an analytics report.

19 Claims, 3 Drawing Sheets

U.S. PATENT DOCUMENTS

| | | | |
|---|---|---|---|
| 2002/0103798 A1 | 8/2002 | Abrol et al. | |
| 2002/0112048 A1* | 8/2002 | Gruyer et al. | 709/224 |
| 2002/0169868 A1 | 11/2002 | Lopke et al. | |
| 2003/0028591 A1 | 2/2003 | Goloshubin et al. | |
| 2003/0084377 A1 | 5/2003 | Parks et al. | |
| 2003/0115189 A1 | 6/2003 | Srinivasa et al. | |
| 2004/0260715 A1 | 12/2004 | Mongeon et al. | |
| 2005/0210024 A1 | 9/2005 | Hurst-Hiller et al. | |
| 2005/0240580 A1 | 10/2005 | Zamir et al. | |
| 2006/0004711 A1 | 1/2006 | Naam | |
| 2006/0064339 A1 | 3/2006 | Allred | |
| 2006/0085379 A1 | 4/2006 | Heidloff et al. | |
| 2006/0277205 A1 | 12/2006 | Song et al. | |
| 2007/0121626 A1 | 5/2007 | Shepard | |
| 2007/0208730 A1 | 9/2007 | Agichtein et al. | |
| 2008/0005091 A1 | 1/2008 | Lawler et al. | |
| 2008/0030764 A1 | 2/2008 | Zhu et al. | |
| 2008/0114751 A1 | 5/2008 | Cramer et al. | |
| 2008/0114875 A1 | 5/2008 | Anastas et al. | |
| 2008/0147673 A1* | 6/2008 | Candea et al. | 707/10 |
| 2008/0147731 A1 | 6/2008 | Narayana et al. | |
| 2008/0172374 A1 | 7/2008 | Wolosin et al. | |
| 2008/0195646 A1 | 8/2008 | Meijer et al. | |
| 2008/0235243 A1* | 9/2008 | Lee et al. | 707/10 |
| 2008/0270469 A1 | 10/2008 | Myerson et al. | |
| 2008/0275951 A1 | 11/2008 | Hind et al. | |
| 2008/0281809 A1 | 11/2008 | Anderson et al. | |
| 2008/0294760 A1 | 11/2008 | Sampson et al. | |
| 2009/0006478 A1* | 1/2009 | Rikhtverchik et al. | 707/104.1 |
| 2009/0013270 A1 | 1/2009 | Helfman et al. | |
| 2009/0013287 A1 | 1/2009 | Helfman et al. | |
| 2009/0049052 A1 | 2/2009 | Sharma et al. | |
| 2009/0049372 A1 | 2/2009 | Goldberg | |
| 2009/0070337 A1 | 3/2009 | Romem et al. | |
| 2009/0198507 A1 | 8/2009 | Rhodus | |
| 2009/0293018 A1 | 11/2009 | Wilson et al. | |
| 2010/0070514 A1* | 3/2010 | Woodruff | 707/754 |
| 2010/0125505 A1* | 5/2010 | Puttaswamy | 705/14.67 |
| 2010/0169792 A1* | 7/2010 | Ascar et al. | 715/744 |
| 2010/0174714 A1 | 7/2010 | Asmundsson et al. | |
| 2010/0332531 A1 | 12/2010 | Galande | 707/770 |
| 2010/0332550 A1 | 12/2010 | Ainslie | 707/802 |
| 2011/0029489 A1 | 2/2011 | Zhao | 707/648 |
| 2011/0029509 A1 | 2/2011 | Kumthekar et al. | 707/723 |
| 2011/0029516 A1 | 2/2011 | Chang et al. | 707/734 |
| 2011/0066608 A1 | 3/2011 | Graham, Jr. et al. | |

OTHER PUBLICATIONS

"Malaysian Public Sector Open Source Software (OSS) Program Web Application Guidelines," pp. 1-42 (Apr. 2008).

"Objectivity/HA—The High Availability Option," http://www.objectivity.com/pages/objectivity/high_availability.asp, pp. 1-5 (Publicly known at least as early as Apr. 22, 2009).

"Predictive Analysis with SQL Server 2008, White Paper," http://download.microsoft.com/download/6/9/D/69D1FEA7-5B42-437A-B3BA-A4AD13E34EF6/SQL2008PredictAnalysis.docx, pp. 1-15 (Jul. 2008).

"Rdb: Distributed Option," http://www.oracle.com/technology/products/rdb7/htdocs/ fs_dist.htm, pp. 1-2 (Publicly known at least as early as Apr. 22, 2009).

"Server-side or client-side web analytics (part 2)," http://www.vdgraaf.info/server-side-or-client-side-web-analytics-part-2.html, 3 pages (Jul. 25, 2007).

"Web analytics," *Wikipedia, the free encyclopedia*, http://en.wikipedia.org/wiki/Web_analytics, 9 pages (Apr. 12, 2009).

"What Makes CardioLog Different the best SharePoint reporting solution," http://www.intlock.com/intlocksite/ProductsAndServices/CardioLog/What-Makes-CardioLog-Different.asp, pp. 1-2 (Copyright 2008).

Agichtein, E. et al., Identifying "Best Bet" Web Search Results by Mining Past User Behavior, *Proceedings of the 12th ACM SIGKDD International Conference on Knowledge Discovery and Data Mining*, Philadelphia, Pennsylvania, 7 pages (Aug. 20-23, 2006).

Bilenko, M. et al., "Mining the Search Trails of Surfing Crowds: Identifying Relevant Websites From User Activity," *Proceeding of the 17th International Conference on World Wide Web*, Beijing, China, 10 pages (Apr. 21-25, 2008).

Bruggeman, M. et al., "Exploring the Data View Web Part," http://www.lcbridge.nl/vision/2009/dvwp.htm, pp. 1-17 (Feb. 19, 2009).

Burton, M. et al., "The Value of Web Log Data in Use-Based Design and Testing," *JCMC*, vol. 6, No. 3, pp. 1-26, http://jcmc.indiana.edu/vol6/issue3/burton.html (Apr. 2001).

Chang, F. et al., "Bigtable: A Distributed Storage System for Structured Data," *OSDI 2006*, pp. 1-14 (2006).

Eckerson, W., "Federating Distributed Data," *Information Management Magazine*, http://www.information-management.com/issues/9991101/1555-1.html, pp. 1-2 (Nov. 1, 1999).

Horowitz, J. et al., "Decomposing Heterogeneous Inter-Entity Relationship Updates," *IEEE Transactions on Knowledge and Data Engineering*, vol. 4, No. 4, pp. 360-370 (Aug. 1992).

Huang, Z. et al., "A Graph Model for E-Commerce Recommender Systems," *Journal of the American Society for Information Science and Technology*, vol. 55, No. 3, pp. 259-274 (2004).

Imhof, J., "Web search enhancement based on User Behaviour Information," https://www.dbis.ethz.ch/education/ss2007/07_dbs_algodbs/ImhofReport.pdf, pp. 1-23 (Jun. 11, 2007).

Imhoff, C., "Active Data Warehousing—the Ultimate Fulfillment of the Operational Data Store," http://www.teradata.com/t/assets/0/206/276/33b475d5-edlc-4eef-81be-51507e7c0667.pdf, pp. 1-14 (Copyright 2001).

Jones, M., "Web-based Data Management," http://www.ecoinformatics.org/pubs/guide/jones.fv2.htm, pp. 1-8 (Publicly known at least as early as Apr. 22, 2009).

Norguet, J. et al., "A Page-Classification Approach to Web Usage Semantic Analysis," *Engineering Letters*, vol. 14, 7 pages (Feb. 12, 2007).

Olamendy, J., "Distributed Database Management Systems," http://www.c-sharpcorner.com/UploadFile/john_charles/DistributedDatabaseManagementSystems12172008141339PM/DistributedDatabaseManagementSystems.aspx, pp. 1-3 (Dec. 17, 2008).

Olszak, C. et al., "Business Intelligence Systems in the Holistic Infrastructure Development Supporting Decision-Making in Organisations," *Interdisciplinary Journal of Information, Knowledge, and Management*, vol. 1, pp. 47-58 (2006).

Qiu, F. et al., "Automatic Identification of User Interest for Personalized Search," *Proceedings of the 15th International Conference on World Wide Web*, Edinburgh, United Kingdom, 10 pages (May 22-26, 2006).

Son, L. et al., "The Visualisation of Internet Usage," *Southern African Networks and Applications Conference (SATNAC)* 2004, 6 pages (Sep. 6-8, 2004).

Strumme, G. et al., "Usage Mining for and on the Semantic Web," *Proc. NSF Workshop on Next Generation Data Mining*, Baltimore, Maryland, 10 pages (Nov. 2002).

U.S. Appl. No. 12/512,859, filed Jul. 30, 2009, entitled "Web-Usage Pattern Insight Platform".

U.S. Appl. No. 12/492,704, filed Jun. 26, 2009, entitled "Platform for Configurable Logging Instrumentation".

U.S. Appl. No. 12/512,845, filed Jul. 30, 2009, entitled "Best-Bet Recommendations".

U.S. Appl. No. 12/492,675, filed Jun. 26, 2009, entitled "Batched Transfer of Arbitrarily Distributed Data".

U.S. Appl. No. 12/512,661, filed Jul. 30, 2009, entitled "Dynamic Information Hierarchies".

Velayathan, G. et al., "Behavior Based Web Page Evaluation," *Proceedings of the 16th International Conference on World Wide Web*, Banff, Alberta, Canada, pp. 1317-1318 (May 8-12, 2007).

Wade, A., "Single Logical View over Enterprise-Wide Distributed Databases," *Proceedings of the 1993 ACM SIGMOD International Conference on Management of Data*, Washington, D.C., pp. 441-444 (May 26-28, 1993).

Zhu, T. et al., "Using Learned Browsing Behavior Models to Recommend Relevant Web Pages," *International Joint Conferences on Artificial Intelligence*, http://dli.iiitac.in/ijcai/IJCAI-05/PDF/post-0462.pdf, 3 pages (Aug. 1, 2005).

U.S. Official Action in U.S. Appl. No. 12/492,704 dated Sep. 13, 2011.

Notice of Allowance/Allowability in U.S. Appl. No. 12/512,661 dated Nov. 25, 2011.
U.S. Official Action in U.S. Appl. No. 12/492,704, dated Mar. 12, 2012.
U.S. Official Action in U.S. Appl. No. 12/492,675, dated Feb. 28, 2012.
U.S. Official Action in U.S. Appl. No. 12/492,704 dated Aug. 27, 2012.
Google Search Browser Tracking Privacy Opt In Script, cited in U.S. Appl. No. 12/492,704 Office Action dated Aug. 27, 2012, 2 pages. Obtained at: http://scholar.google.com/scholar?q=browser+tracking+privacy+opt+in+script&hI=en&as_sdt=0%2C47.
Google Search Browser Tracking Privacy Opt In, cited in U.S. Appl. No. 12/492,704 Office Action dated Aug. 27, 2012, 2 pages. Obtained at: https://www.google.com/. . . 2.4019.0j24j2.26.0.les%3B..0.0 . . . 1c.DKMb5sMNzm4&pbx=1&bav=on.2,or.r_gc.r_pw.r_qf.&fp=9de1efddb02d62a&biw=1286&bih=739.
Website ACM Digital Library, cited in U.S. Appl. No. 12/492,704 Office Action dated Aug. 27, 2012, 4 pages. Obtained at: http://d1.acm.org/results.cfm?h=1&cfid=145420465&cftoken=72454782.
U.S. Official Action in U.S. Appl. No. 12/512,859, dated Sep. 27, 2012.
U.S. Official Action in U.S. Appl. No. 12/492,675, dated Sep. 26, 2012.

* cited by examiner

LOAD-BALANCING AND SCALING FOR ANALYTICS DATA

RELATED APPLICATIONS

Related U.S. patent application Ser. No. 12/512,859, filed on Jul. 30, 2009 entitled "Web Usage Pattern Insight Platform," assigned to the assignee of the present application, is hereby incorporated by reference.

Related U.S. patent application Ser. No. 12/492,704, filed on Jun. 26, 2009 entitled "Platform for Configurable Logging Instrumentation," assigned to the assignee of the present application, is hereby incorporated by reference.

Related U.S. patent application Ser. No. 12/512,845, filed on Jul. 30, 2009 entitled "Best-Bet Recommendations," assigned to the assignee of the present application is hereby incorporated by reference.

Related U.S. patent application Ser. No. 12/492,675, filed on Jun. 26, 2009 entitled "Batched Transfer of Arbitrarily Distributed Data," assigned to the assignee of the present application, is hereby incorporated by reference.

Related U.S. patent application Ser. No. 12/512,661, filed on Jul. 30, 2009 entitled "Dynamic Information Hierarchies," assigned to the assignee of the present application, is hereby incorporated by reference.

BACKGROUND

Load-balancing and scaling for analytics data is a process for distributing usage data across multiple servers. In some situations, analytics data for a large web site can consume large amounts of storage. For example, data relating to statistics such as user counts, page hits, bounce-rates, and content rating may rapidly fill up storage associated with a single server. Separating data onto different servers may cause problems with applications that need to access the data, such as reporting tools. For example, adding a new data server may require a new version of the reporting tool to be distributed and installed.

SUMMARY

Load-balancing and scaling for analytics data may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Load-balancing and scaling for analytics data may be provided. A logging system may receive data and select a stager database in which to store the data. The selection may be made according to an identifier associated with the data. The stored data may be processed and stored back to the stager database before being copied to a reporting database. The processed data may be aggregated with other data in the reporting database to provide an analytics report.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Load-balancing and scaling for analytics data may be provided. In order to store and process large amount of the web site usage data, data may be automatically distributed to multiple staging databases based on user ID, a client-side cookie, and/or a browser session ID. The usage data may be processed on multiple servers in parallel and the processed data may be saved back to the same databases where the raw usage data was stored. The processed data may be automatically distributed to multiple reporting databases based on reporting requirements, and may be aggregated or analyzed for various web analytics reports.

Figure 1:
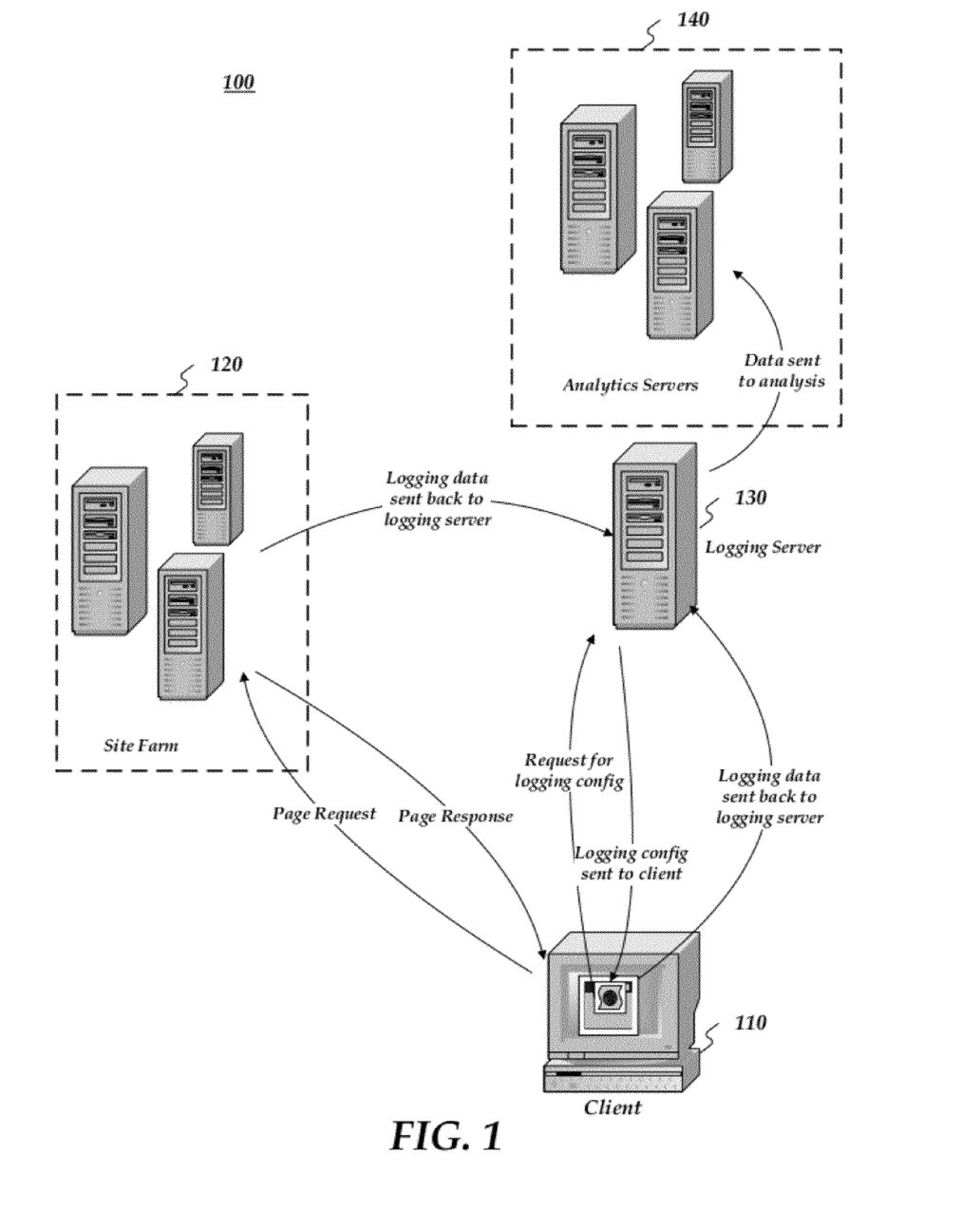
FIG. 1 is a block diagram of an operating environment.

FIG. 1 is a block diagram of an operating environment 100. Operating environment 100 may comprise a client device 110, a web site farm 120, a logging server 130, and an analytics server 140. Client device 110 may comprise, for example, a computing device 300 such as that described in greater detail below with respect to FIG. 3. Web site farm 120 may comprise one and/or a plurality of server computers operative to host web pages and/or applications associated with one and/or more web sites. Client device 110, web site farm 120, logging server 130, and analytics server 140 may be in communication with each other over a computing network or other communications medium. For example, client device 110 may be operative to request and retrieve a web page from a web server associated with site farm 120 via the network.

The retrieved web page may comprise a plurality of rendering instructions encoded in a markup language, such as HyperText Markup Language (HTML). The markup language may provide a means to describe the structure of text-based information in a document by identifying the structure of text elements as links, headings, paragraphs, lists. The markup language may also supplement the text with objects such as form controls, images, and executable scripts. Executable scripts may enable programmatic access to other objects on the page and to hardware and/or software associated with client device 110. For example, a logging object may be operative to detect activities associated with user interface devices attached to client device 110, such as a keyboard and/or mouse, and store the detected activity on a local storage device, such as RAM and/or a hard drive.

Figure 2:
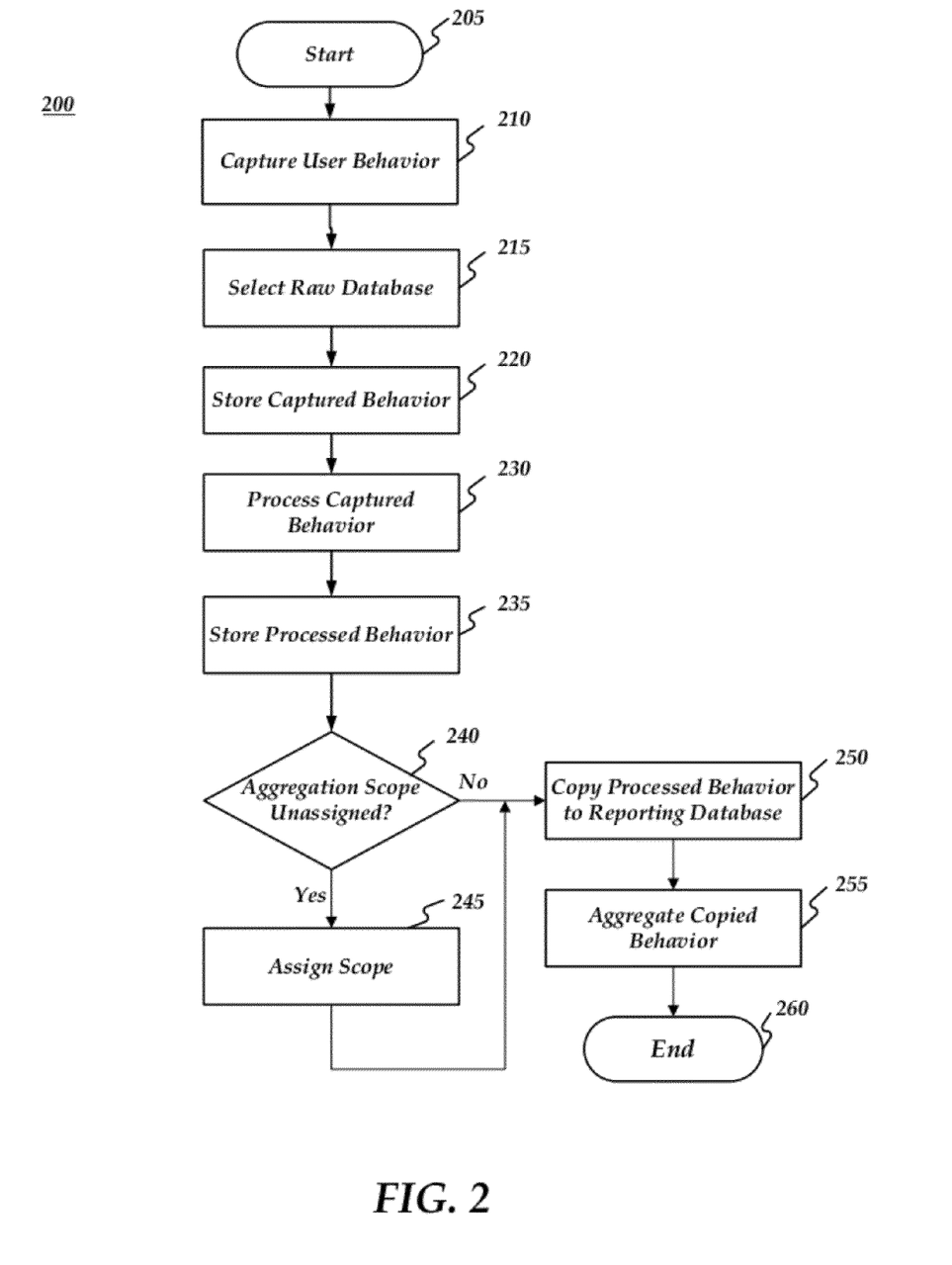
FIG. 2 is a flow chart of a method for providing batch transfer of arbitrarily distributed data.

FIG. 2 is a flow chart setting forth the general stages involved in a method 200 consistent with an embodiment of the invention for providing load-balancing and scaling for analytics data. Method 200 may be implemented using computing device 300 as described in more detail below with respect to FIG. 3. Ways to implement the stages of method 200 will be described in greater detail below. Method 200 may begin at starting block 205 and proceed to stage 210 where computing device 300 may capture a user behavior. For example, client 110 may send a search query to a web site associated with site farm 120. The web site may respond with a plurality of results associated with the search query, such as a list of links to other web pages, and client 110 may select one of the results to explore. The search query, the list of results, and the selection of the results may each comprise a captured user behavior, and each captured user behavior may be associated with an identifier such as a user ID (e.g. a user name or numeric identifier), a client-side cookie, and/or a browser session ID. A client-side cookie may comprise a small piece of text stored on client 110 by a web browser. The cookie may comprise name-value pairs containing bits of information such as user preferences, shopping cart contents, the identifier for a server-based session, or other data used by websites.

From stage 210, where computing device 300 captured the user behavior, method 200 may advance to stage 215 where computing device 300 may select a raw "stager" database in which to store the captured behavior. The raw database may be based on the identifier associated with the data. By distributing data according to a user-associated identifier, session data may be kept together for analysis and extrapolation.

The raw databases may each be assigned a number from 0 to N−1 if there are N databases. The database number to send the usage data to may be determined by the following formula: Database Number=identifier hash MOD number of raw databases. The identifier hash may comprise an integer hash of the user ID and/or browser session ID. Given two numbers, a (the dividend) and n (the divisor), a modulo n (abbreviated as a MOD n) is the remainder, on division of a by n.

For example, logging server 130 may comprise five raw databases, as different logical databases and/or as different physical database servers. A plurality of captured user behaviors associated with a user ID of 32 from client 110 may be sent to logging server 130 for storage. Logging server 130 may compute the database number for storing the captured behaviors as 32 MOD 5=2. The five database servers may each be assigned a number from 0 to 4, and the captured behavior may be stored in the raw database assigned the number 2.

Consistent with embodiments of the invention, an integer hash function may be applied to the identifier associated with the captured behaviors prior to performing the modulus operation. For example, a browser session ID may comprise a very large hex and/or alphanumeric value that may be incremented by a web browser application each time it is instantiated (e.g. "w42g1ees1abjmujuqququf55"). The integer hash function may comprise a hash table operative to convert such alphanumeric strings to an integer value that may be used in the modulus operation.

From stage 215, method 200 may advance to stage 220 where computing device 300 may store the captured behavior in the selected raw database. For example, logging server 130 may store the captured behavior received from client 110 in a database selected according to the function described above.

From stage 220, method 200 may advance to stage 230 where computing device 300 may process the captured behavior. For example, logging server 130 may send a batch of captured behaviors from a plurality of users to analytics server 140 for processing. Analytics server 140 may examine the behaviors according to reporting insight algorithms and produce processed output data. An example of processing data may comprise calculating a dwell time and a satisfaction rating for a web page based a captured load time and a captured unload time of the page. Other processing examples may comprise removing an unwanted data element, calculating a behavior metric, and/or calculating a satisfaction classification.

Once computing device 300 processes the captured behavior in stage 2230, method 200 may continue to stage 235 where computing device 300 may store the processed data back to the raw database from which the captured behavior was retrieved. For example, captured behavior processed from raw database number 2 associated with logging server 130 may be stored back into raw database number 2.

After computing device 300 stores the processed data in stage 235, method 200 may proceed to stage 240 where computing device 300 may determine whether any of a plurality of aggregation scopes are unassigned to a reporting databases. Aggregation scopes may comprise, for example, a hierarchy level associated with site farm 120 such as all content associated with site farm 120, a collection of web pages and/or applications such as a site or sub-site, all content associated with an organization, an individual web page, and/or an individual web application. Each of the aggregation scopes may be associated with one and/or more reporting databases. For example, a first reporting database may be associated with a site farm aggregation scope and a second reporting database may be associated with a plurality of single site aggregation scopes. That is, the second reporting database may be associated with several different individual sites. Computing device 300 may determine that an aggregation scope is unassigned, for example, by determining that processed data is associated with a newly added web site, but that no reporting database is assigned to receive that processed data.

If, at stage 240, computing device 300 determines that an aggregation scope is unassigned, method 200 may advance to stage 245 where computing device 300 may assign the aggregation scope to a reporting database. For example, logging server 130 may build a list of unassigned scopes and sort the list in order of potential data-volume. Logging server 130 may then build a list of reporting databases and sort the list in order from most-capable to least-capable. Capability may be rated according to a current data volume and storage capacity of the reporting database. The one with the most available space and/or a least amount of current data volume may be considered the most capable. Capability may also be rated according to database performance metrics, such as processor load and/or average data aggregation time. Logging server 130 may iterate through both sorted lists and assign each unassigned scope to a reporting database in round-robin manner. Consistent with embodiments of the invention each reporting database may be assigned one and/or multiple aggregation scopes.

Once computing device 300 assigns any unassigned aggregation scopes in stage 245, or if no aggregation scopes were determined to be unassigned in stage 240, method 200 may advance to stage 250 where computing device 300 may copy the processed data to at least one reporting database according to the assigned aggregation scope. For example, a processed data may comprise a page load count for a web page stored on site farm 120. The web page may comprise one of a plurality of web pages associated with a site collection of web pages, and the site collection may comprise one of a plurality of site collections associated with site farm 120. The processed data may be copied from the raw database to a reporting database associated with an aggregation scope for the individual web page, to a second reporting database associated with an aggregation scope for the site collection, and/or to a third reporting database associated with an aggregation scope for site farm 120.

After the processed data is copied to the reporting database in stage 250, method 200 may advance to stage 255 where computing device 300 may aggregate the copied data. For example, a reporting database receiving a copy of a processed page load count for a given web page may aggregate the newly received processed data with previously received processed data regarding page load counts for the web page. The aggregated data may then be displayed as a report of any and/or all processed data associated with the aggregation scope assigned to the reporting database. Method 200 may then end at stage 260.

An embodiment consistent with the invention may comprise a system for providing data distribution. The system may comprise a memory storage and a processing unit coupled to the memory storage. The processing unit may be operative to receive data, select one of a plurality of database servers according to an identifier associated with the data, store the data in the selected database server, process the data, and aggregate the processed data elements in at least one reporting database server. The data may comprise logged data from user interactions with web sites, pages, and/or applications and may be divided into processing batches based on an associated data identifier. The reporting database server may aggregate the processed data elements into a usage report and expose it to a client application operative to display, filter, search, and analyze such reports.

Another embodiment consistent with the invention may comprise a system for load-balancing analytics data. The system may comprise a memory storage and a processing unit coupled to the memory storage. The processing unit may be operative to capture a user behavior associated with a web site, select a raw data database, store the captured user behavior in the selected raw data database, process the captured user behavior, and store the processed user behavior in the selected raw data database.

Yet another embodiment consistent with the invention may comprise a system for providing load-balancing and scaling for data distribution. The system may comprise a memory storage and a processing unit coupled to the memory storage. The processing unit may be operative to capture a user behavior associated with a web site, select a raw database, and store the captured user behavior in the selected raw database. The raw database may be selected by assigning a sequence number to each of the plurality of raw databases, calculating a database identifier from the user behavior identifier modulated by a total number of the plurality of raw databases, and selecting the sequence number associated with the database identifier. The system may be further operative to process the captured user behavior according to a behavior insight model, store the processed user behavior in the selected raw data database, and determine whether any of a plurality of aggregation scopes are not assigned to at least one of a plurality of reporting databases. If any aggregation scopes are unassigned, the system may be operative to assign the unassigned scope(s) to one of the reporting databases according to a potential data volume of the at least one unassigned scope and/or a data capacity of each of the plurality of reporting databases. The system may be further operative to copy the processed user behavior to one of the reporting databases according to the assigned scope and aggregate the copied user behavior with at least one other copied user behavior of the same type into a usage report. Consistent with embodiments of the invention, the user behavior type may comprise a click-through, a search, a unique visitor count, and/or a dwell time.

Figure 3:
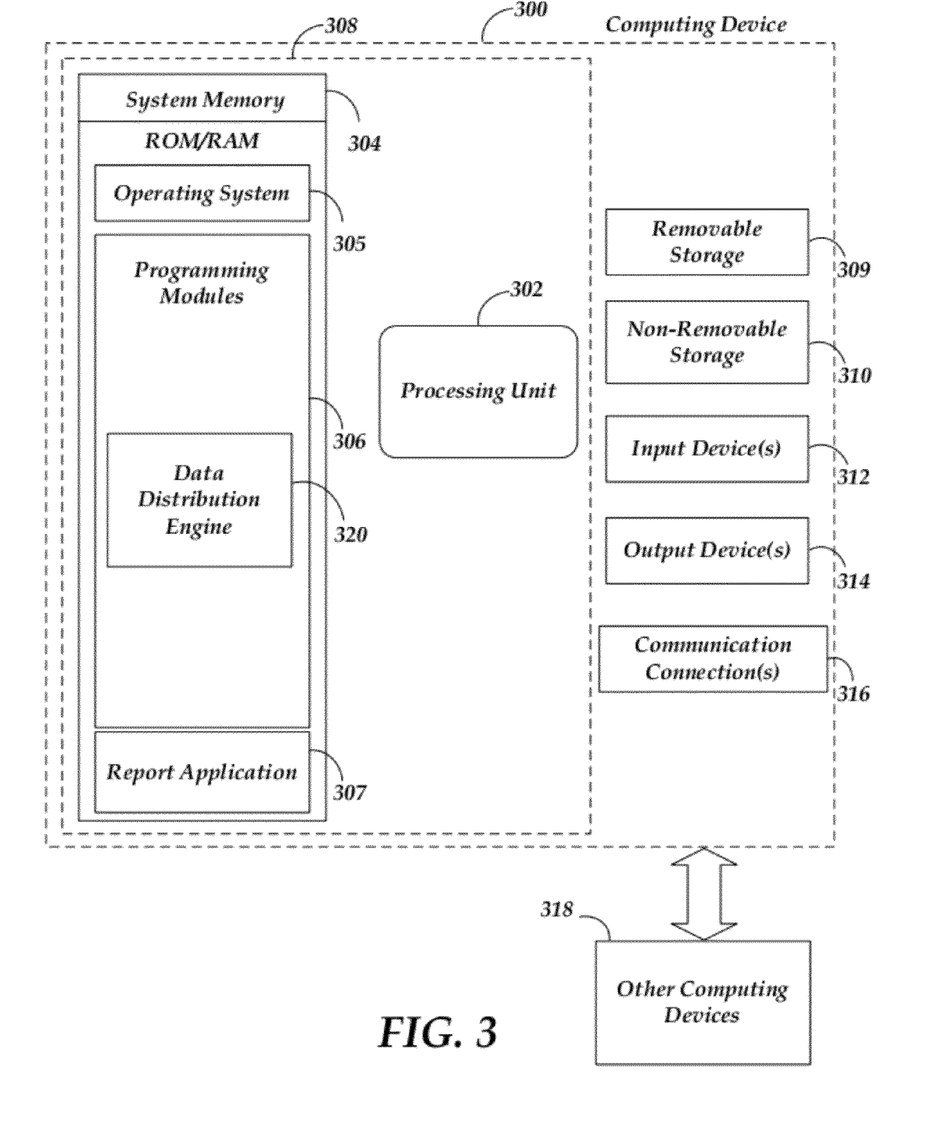
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a report application 307. Operating system 305, for example, may be suitable for controlling computing device 300's operation. In one embodiment, programming modules 306 may include a data distribution engine 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. data distribution 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing data distribution, the method comprising:
   receiving at least one element of data;
   selecting one of a plurality of database servers, wherein each of the plurality of database servers is associated with a sequence number, according to an identifier associated with the at least one element of data wherein selecting the one of the plurality of database servers comprises computing a database sequence number by modulating an identifier associated with the at least one element of data by a total number of the plurality of database servers;
   storing the at least one element of data in the selected database server;
   processing a plurality of data elements stored in at least one of the plurality of database servers, wherein processing the plurality of data elements comprises:
      dividing the plurality of data elements into at least one batch,
      copying the at least one batch of data elements to an analytics server, and
      analyzing the at least one batch of data elements according to an insight model;
   determining whether an aggregation scope associated with the processed plurality of data elements is not assigned to at least one of a plurality of reporting databases; and
   in response to determining that the aggregation scope is not assigned to at least one of a plurality of reporting database servers:
      assigning the aggregation scope to at least one of the plurality of reporting database servers according to a potential data volume of the aggregation scope and a data capacity of each of the plurality of reporting database servers, and
      aggregating the processed plurality of data elements into the at least one of the plurality of reporting database servers.

2. The method of claim 1, wherein the at least one element of data comprises data associated with a user interaction with a web site.

3. The method of claim 1, further comprising aggregating the processed data stored in the at least one reporting database server into a usage report.

4. The method of claim 3, further comprising exposing the usage report to at least one client application.

5. The method of claim 1, wherein the identifier associated with the at least one element of data comprises at least one of the following: a user ID, a client-side cookie, and a browser session ID.

6. The method of claim 1, wherein processing the plurality of data elements stored in at least one of the plurality of database servers comprises at least one of the following: removing an unwanted data element, calculating a behavior metric, and calculating a satisfaction classification.

7. The method of claim 1, wherein storing the processed data elements in at least one reporting database server comprises:
   assigning each of a plurality of aggregation scopes to at least one of a plurality of reporting database servers comprising the at least one reporting database server;
   copying the processed data elements to the at least one reporting database server according to the assigned aggregation scope; and
   aggregating, by each of the plurality of reporting database servers, the processed data elements associated with the assigned aggregation scope for each of the plurality of reporting database servers into at least one usage report.

8. The method of claim 7, wherein the aggregation scope comprises at least one of the following: an organization, a farm, a site, a sub-site, a page, and a web element.

9. The method of claim 7, wherein assigning each of a plurality of aggregation scopes to one of a plurality of reporting database servers comprises:
   sorting the plurality of aggregation scopes in order of potential data volume;
   sorting the plurality of reporting database servers in order of performance capability; and
   iteratively assigning each of the sorted plurality of aggregation scopes to at least one of the sorted plurality of reporting database servers.

10. The method of claim 9, wherein sorting the plurality of reporting database servers in order of performance capability comprises sorting the plurality of reporting database servers according to a current data storage volume of each of the plurality of reporting database servers.

11. The method of claim 1, wherein dividing the plurality of data elements into the at least one batch, comprises associating the at least one batch with the identifier associated with at least one element of data of the plurality of data elements in the at least one batch.

12. A method for load-balancing analytics data comprising:
   capturing a user behavior associated with a web site, wherein the user behavior is associated with a user behavior identifier;
   selecting a raw data database from among a plurality of raw data databases, wherein selecting the raw data database comprises:
      assigning a sequence number to each of the plurality of raw data databases,
      calculating a database identifier from the user behavior identifier modulated by a total number of the plurality of raw databases, and
      selecting the sequence number associated with the database identifier;
   storing the captured user behavior in the selected raw data database;
   processing the captured user behavior, wherein processing the captured behavior comprises:
      dividing a plurality of captured behaviors into at least one batch,
      copying the at least one batch of captured behaviors to an analytics server, and
      analyzing the at least one batch of captured behaviors according to an insight model;
   storing the processed user behavior in the selected raw data database;
   determining whether any of a plurality of aggregation scopes are not assigned to at least one of a plurality of reporting databases; and
   in response to determining that at least one of the plurality of aggregation scopes are not assigned to at least one of a plurality of reporting databases, assign the at least one unassigned scope to at least one of the plurality of reporting databases according to a potential data volume of the at least one unassigned scope and a data capacity of each of the plurality of reporting databases.

13. The method of claim 12, further comprising assigning the processed user behavior to a reporting database.

14. The method of claim 13, further comprising aggregating the processed user behavior with at least one second processed user behavior.

15. The method of claim 13, wherein the processed user behavior is assigned to the reporting database according to at least one of the plurality of aggregation scopes.

16. The method of claim 15, wherein the at least one of the plurality of aggregation scopes comprise at least one of the following: a site farm, an application, a site-collection, a web site, and a web page.

17. The method of claim 12, wherein the raw data database is selected according to an identifier associated with the user behavior.

18. The method of claim 12, wherein processing the captured user behavior comprises batching a plurality of captured behaviors from a user after a configurable time of inactivity from the user.

19. A system for providing load-balancing and scaling for data distribution, the system comprising:
- a memory storage; and
- a processing unit coupled to the memory storage, wherein the processing unit is configured to:
  - capture a user behavior associated with a web site, wherein the user behavior is associated with an identifier comprising at least one of the following: a user ID and a browser session ID;
  - select a raw database from among a plurality of raw databases, wherein being configured to select the raw database comprises being configured to:
    - assign a sequence number to each of the plurality of raw databases,
    - calculate a database identifier from the user behavior identifier modulated by a total number of the plurality of raw databases, and
    - select the sequence number associated with the database identifier;
  - store the captured user behavior in the selected raw database;
  - process the captured user behavior, wherein being configured to process the user behavior comprises being configured to:
    - divide a plurality of captured user behaviors into a batch,
    - copy the batch of captured user behaviors to an analytics server, and
    - analyze the batch of captured user behaviors according to a behavior insight model;
  - store the processed user behavior in the selected raw data database;
  - determine whether any of a plurality of aggregation scopes are not assigned to at least one of a plurality of reporting databases;
  - in response to determining that at least one of the plurality of aggregation scopes are not assigned to at least one of a plurality of reporting databases, assign the at least one unassigned scope to at least one of the plurality of reporting databases according to a potential data volume of the at least one unassigned scope and a data capacity of each of the plurality of reporting databases;
  - copy the processed user behavior to one of the plurality of reporting databases according to the scope assigned to the one of the reporting databases; and
  - aggregate the copied user behavior with at least one other copied user behavior of the same type into a usage report wherein the user behavior type comprises at least one of the following: a click-through, a search, a unique visitor count, and a dwell time.

* * * * *